United States Patent [19]

Shannon

[11] Patent Number: 5,094,104

[45] Date of Patent: Mar. 10, 1992

[54] RATE OF TURN INDICATOR

[76] Inventor: E. Paul Shannon, Route 2, Box 249, Killen, Ala. 35645

[21] Appl. No.: 578,148

[22] Filed: Sep. 6, 1990

Related U.S. Application Data

[63] Continuation-in-part of Ser. No. 410,285, Sep. 21, 1989, Pat. No. 4,984,459.

[51] Int. Cl.⁵ .................... G01C 19/06; G01C 19/42
[52] U.S. Cl. .................................. 73/178 R; 73/504; 74/5.6 E; 74/5.7
[58] Field of Search ............... 73/178 R, 504; 74/5.7, 74/5.6 E

[56] References Cited

U.S. PATENT DOCUMENTS 4,316,389  2/1982  Shannon .......................... 73/504

Primary Examiner—Donald O. Woodiel
Attorney, Agent, or Firm—Hugh D. Jaeger

[57] ABSTRACT

Rate of turn indicator for a nautical vessel, aircraft and the like indicating the rate of turn or swing in units such as degrees per unit of time from a particular course of travel. The indicator includes a magnetic gyro wheel including a flexible hub rotating about an axis in the same plane as the course of travel, and electromagnetic sensing coils receiving the deviations of strength of the electromagnetic field of the magnetic gyro wheel from an axis on turning from the course of travel. The magnetic gyro wheel includes a plurality of permanent magnets of alternating poles positioned about a circumferential axis of a circular member, and a flexible hub material affixed to the interior diameter of the circular member. The hub is affixed to an axially support shaft. The rate of turn indicator includes a meter connected to the electromagnetic sensing coils through electrical circuitry and a potentiometer for zeroing the meter where the meter indicates the rate of turn.

2 Claims, 10 Drawing Sheets

RATE OF TURN INDICATOR

CROSS REFERENCES TO CO-PENDING APPLICATIONS

This application is a continuation-in-part of U.S. Patent application Ser. No. 07/410,285, filed Sept. 21, 1989, entitled "Rate of Turn Indicator", now U.S. Pat. No. 4,984,459.

BACKGROUND OF THE INVENTION

1. Field of the Invention

The present invention relates to a navigational aid or nautical instrument, and more particularly, pertains to a rate of turn indicator for indicating the rate of turn from a course of travel for a vessel or other like vehicle.

2. Description of the Prior Art

One of the most critical problems confronting the shipping industry, particularly towboats, is steering a vessel on a straight and true course without swinging or turning from the predetermined course due to forces of nature such as winds, tides, waves, etc.

The prior art gyros also contain many points of mechanical friction which make them difficult or impossible to respond to very low rates of turn and to properly return to zero.

Prior art gyroscopic instruments have been very expensive. The prior art gyros are usually complex, expensive, electromechanical instruments with numerous mechanical components subject to structural failure, in addition to electrical failure. The prior art instruments have included components such as gears, springs, rotors and brushes, centrifugal switches, all of which are subject to failure. Finally, the instruments have circuitry which sparks and can be hazardous in explosive environments. In any event, if the instruments are purchased, after a costly financial outlay by an operator, the installation, subsequent maintenance, and repair are expensive.

The present invention overcomes the disadvantages of prior art by providing a rate of turn indicator having easy visual readout for a steersman of a vessel that a rate of turn or swing is occurring, and yet sensitive and accurate to the rate of turn while eliminating prior art problems due to friction between components.

SUMMARY OF THE INVENTION

The present invention provides a rate of turn indicator for visually indicating the rate of turn or swing from a course of travel on a zero-center meter positioned on the face of the rate of turn indicator. This meter indication provides visual information to the steersman of the vessel indicating that the vessel is being subjected to a turning motion either to the left or the right, and also provides visual indication for bringing the vessel back onto a straight course if desired.

According to one embodiment of the present invention, there is provided a rate of turn indicator including a motor directly axially rotating a flexible hub magnetic gyro wheel, electromagnetic sensing coils on an adjustable spaced mounting plate adjacent to the magnetic gyro wheel and diametrically opposed to each other, and electrical circuitry connected between the coils and a zero-center meter whereby the rotating flexible hub magnetic gyro wheel induces a current in both coils which drives the meter to one side of center indicating a rate of turn or swing from a course of travel of the vessel. The magnetic gyro wheel includes a hub of flexible material having properties which provide for axial rotation and flexible lateral movement. The magnetic gyro wheel supports at least one pair of permanent magnets, and, as disclosed, a plurality of permanent magnets of alternating poles circumferentially spaced around the flexible hub of the magnetic gyro wheel. Mechanical adjustment structures are provided for adjusting the relative distance of the electromagnetic sensing coils with respect to the magnetic gyro wheel providing for coarse adjustment of zero centering of the meter along with a potentiometer providing for fine adjustment of the meter. The wheel may be adjusted toward or away from the coils in order to adjust the sensitivity of the instrument. Electrical circuitry is provided for high and low sensitivity of the meter indicating rate of turn or swing from the present course of travel.

One significant aspect and feature of the present invention is a rate of turn indicator which provides direct visual indication to a steersman of a vessel or other like vehicle that a rate of turn or swing is occurring from a course of travel in an angular direction as indicated by the swing of a meter needle from the zero center on the face of a meter. This rate of turn or swing is an easily identifiable visual indication to the steersman of the vessel and provides direct, easily observable indication that a rate of turn or swing is occurring in proportion to the deflection of the meter needle from the zero center on the meter face providing for compensation by the steersman of the vessel. The zero center position of the meter is very important, especially when docking a vessel in inland waterways.

Another significant aspect and feature of the present invention is a rate of turn indicator which is of minimal complexity and has a minimum of moving parts, the flexible hub magnetic gyro wheel, and the meter movement. The present invention relies on the recognition of principles of gyroscopic action, magnetic principles, conduction of currents, and electrical circuitry resulting in a navigational instrument which provides for visual indication of rate of turn or swing from a particular course of travel. The flexible hub magnetic gyro wheel is axially rotated by a motor. The rate of turn indicator is a substantially linear instrument.

A further significant aspect and feature of the present invention is a rate of turn indicator which can be moved from position to position within a wheelhouse, or carried between wheelhouses of vessels and only needs be set upon a substantially flat surface, usually within the view of a steersman of a vessel and in view from the steering position of the vessel. No alignment of the instrument is necessary except for centering of the meter with the zero-center control for the fine adjustment. If coarse adjustment of sensitivity is required for the rate of turn indicator, the sensitivity is adjusted by using the knurled knob and the nut which is accessed through the hole at the bottom rear of the unit. Low and high sensitivity ranges are selected by a toggle switch on the front panel. The instrument is of a compact physical size requiring minimal space and of a desirable small weight not presenting a burdensome weight restriction. Finally, the rate of turn indicator as disclosed can easily operate from the vessel's current.

Having described the present invention, it is a principal objective hereof to provide a rate of turn indicator.

One object of the present invention is to provide a rate of turn indicator having direct visual readout of the rate of turn or swing from a course of travel which is visually perceived and understandable by a steersman of a vessel or other like vehicle. The navigational instrument, being the rate of turn indicator, visually displays the information readily readable on a meter face of the instrument, and corresponds proportionally to the angular turn or swing of the vessel, which may include a tow of barges or just a vessel itself, such as a towboat, freighter, tanker, or other like vehicle.

Another object of the present invention is to provide a rate of turn indicator utilizing a magnetic gyro wheel of novel construction with minimal components, especially friction components, and of economical feasibility. One requirement is that the flexible hub magnetic gyro wheel is axially rotated about a motor axis and is flexible providing for lateral movement corresponding to the angular directional turn of a vessel or like vehicle. The magnetic gyro wheel meets this objective by providing a plurality of permanent magnetic domains of alternating poles spaced about an outer periphery of a circumferential, flexible hub member having axial stiffness, but lateral flexibility providing for gyroscopic action of the magnetic poles of the magnetic gyro wheel occurring on account of variation from the course of steerage.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
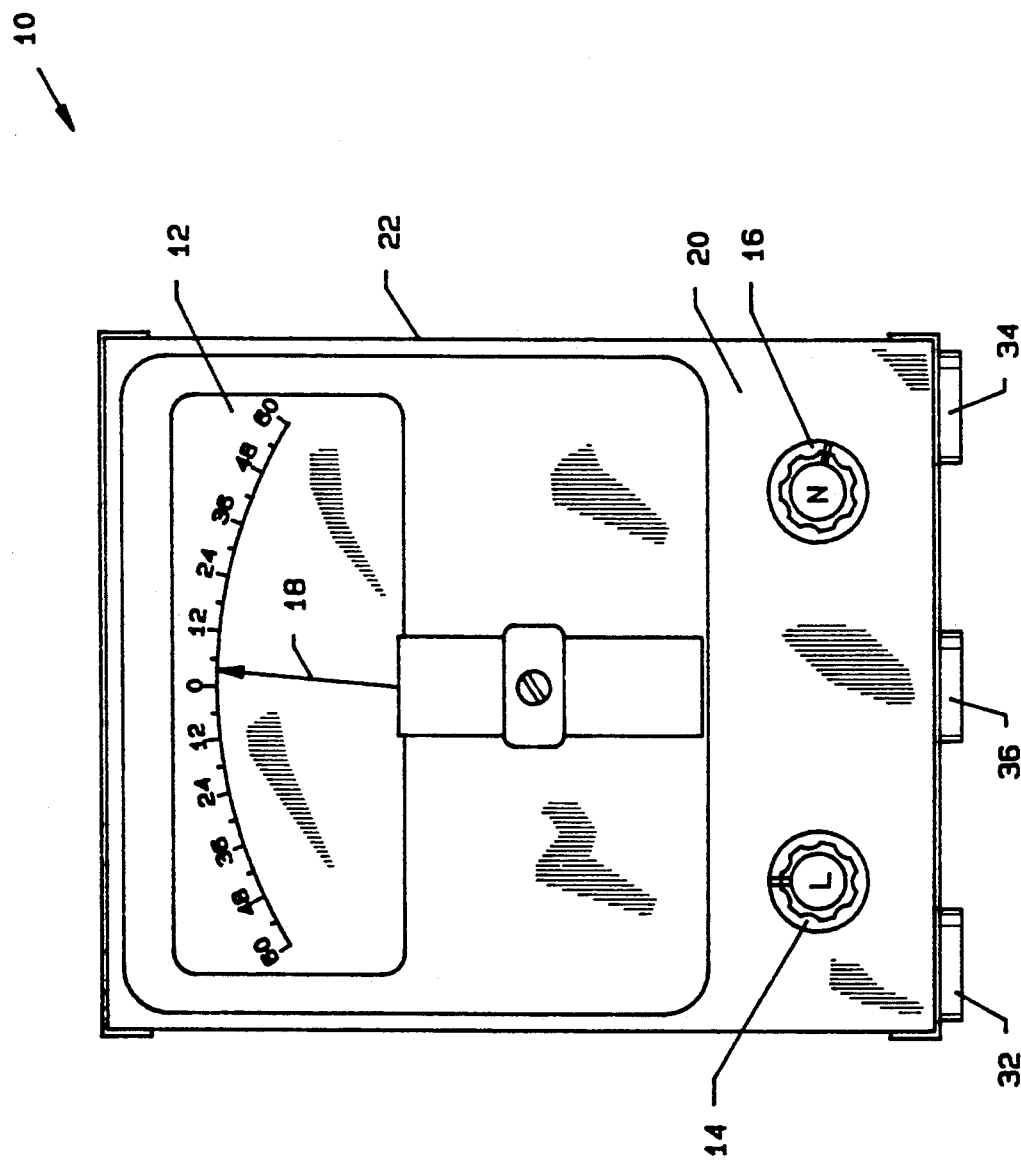
FIG. 1 illustrates a front plan view of a rate of turn indicator constructed according to the present invention.

FIG. 1 illustrates a front view of a rate of turn indicator 10 including a display meter 12, a light control 14 and a centering control 16 for an indicator needle 18 of the display meter 12, all of which mount on a front panel 20 of a housing 22.

Figure 2:
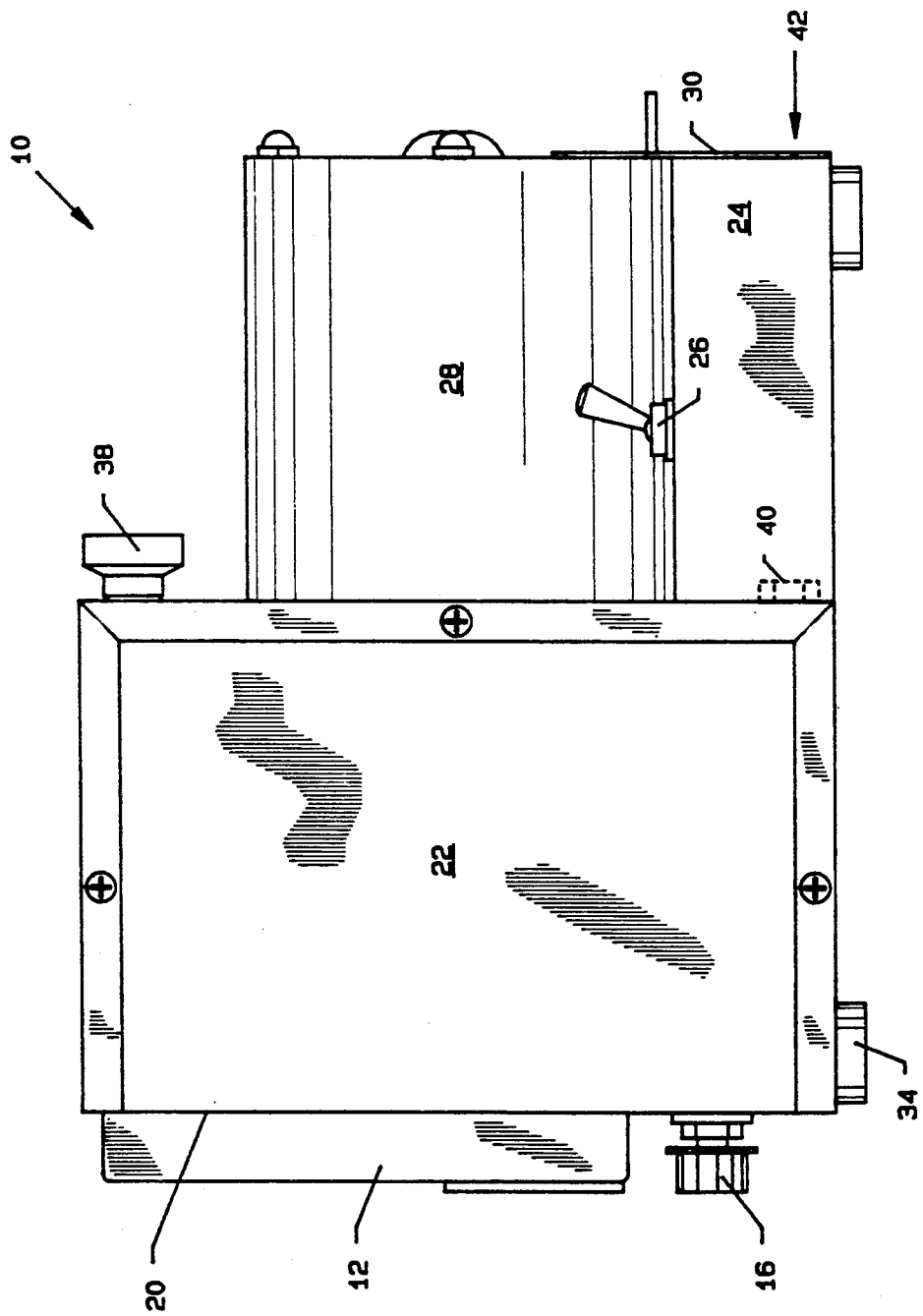
FIG. 2 illustrates a side view of the rate of turn indicator.

FIG. 2 illustrates a side view of a rate of turn indicator including a rear housing 24, a power switch 26 and a motor 28. A rear panel 30 engages over the rear housing 24. Rubber feet 32, 34 and 36 support the housing as illustrated in FIG. 1 and FIG. 2. An external adjustment nut 38 and an internal adjustment nut 40 adjust the coil support as later described in detail.

Figure 3:
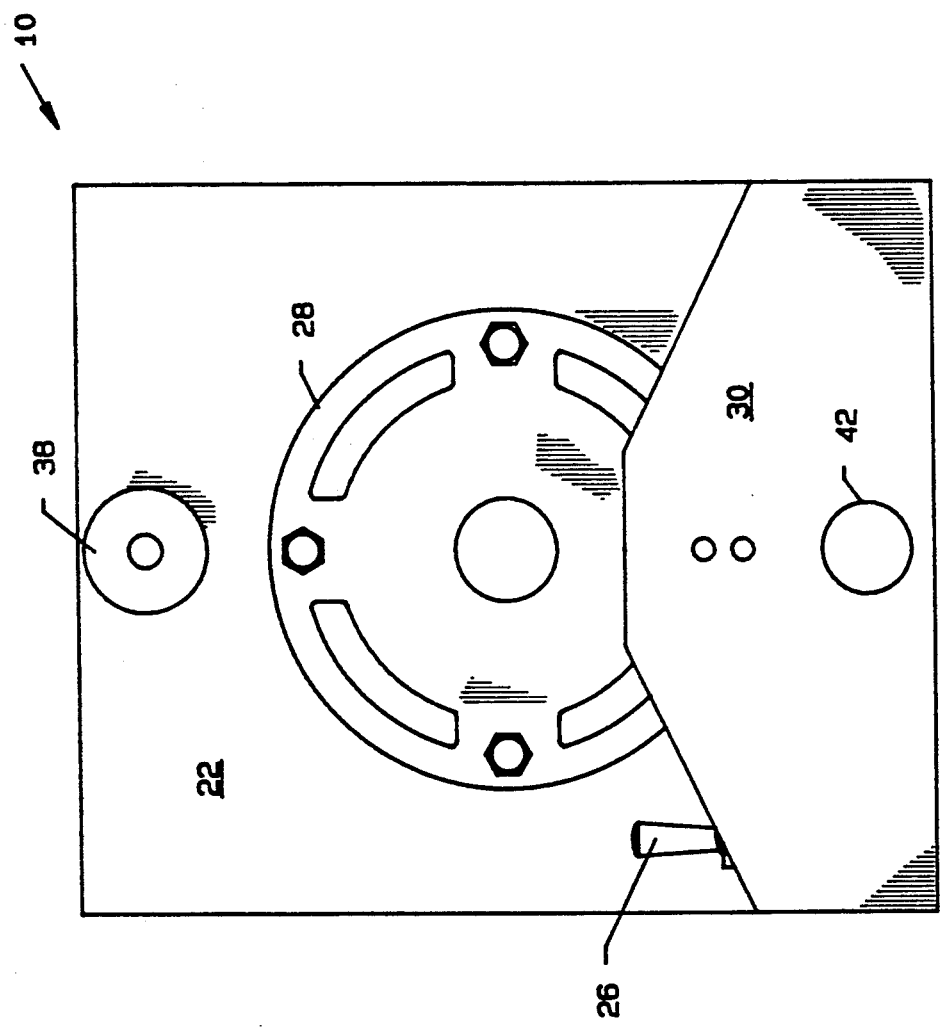
FIG. 3 illustrates a rear view of the rate of turn indicator.

FIG. 3 illustrates a rear view of the rate indicator 10 where all numerals correspond to those elements previously described. A hole 42 is included for adjustment of a threaded shaft 46 illustrated in FIG. 4.

Figure 4:
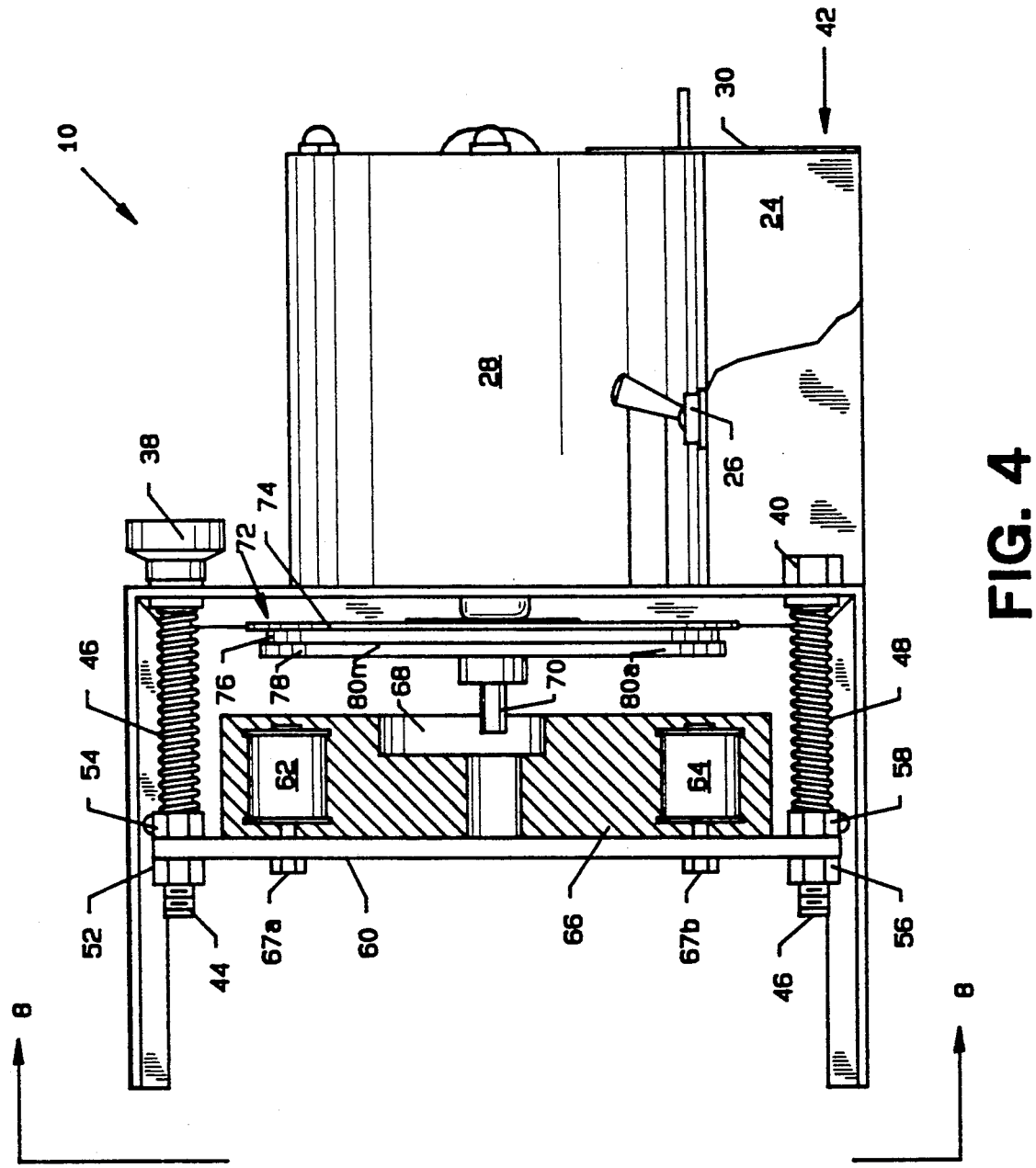
FIG. 4 illustrates a side view in cutaway of the rate of turn indicator.

FIG. 4 illustrates a side view in cutaway of the rate of turn indicator 10 with the front panel removed where all numerals correspond to those elements previously described. Threaded shafts 44 and 46 with biasing springs 48 and 50 and securing nuts 52, 54, 56 and 58 support a coil support 60 with coil 62 and 64 polymerically imbedded onto the coil support with a polymer 66. Bolts 67a–67b secure through the coil support 60 into coils 62 and 64. A hole 68 in the polymer 66 is provided to accommodate a shaft 70 of the motor. A gyro wheel 72 fixedly secures on the motor shaft and includes juxtaposed round steel disk 74, round disk of flexible gasket material 76 and round magnetic disk 78 including a plurality of magnetic areas 80a–80n of alternating plurality as illustrated in FIG. 7.

Figure 5:
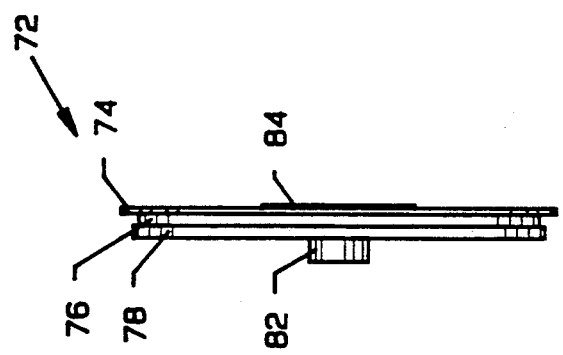
FIG. 5 illustrates a side view of a flexible hub magnetic gyro wheel.

FIG. 5 illustrates a side view of the gyro wheel 72 where all numerals correspond to those elements previously described. The gyro wheel 72 includes a central hub 82, and a hub plate 84 secured through the steel disk 74, through the flexible gasket disk 76 and through the magnetic disk 78 to the central hub 82. The central hub 82 includes a horizontally aligned hole 86 for engagement with the motor shaft 70 of the motor 28 illustrated in FIG. 4.

Figure 6:
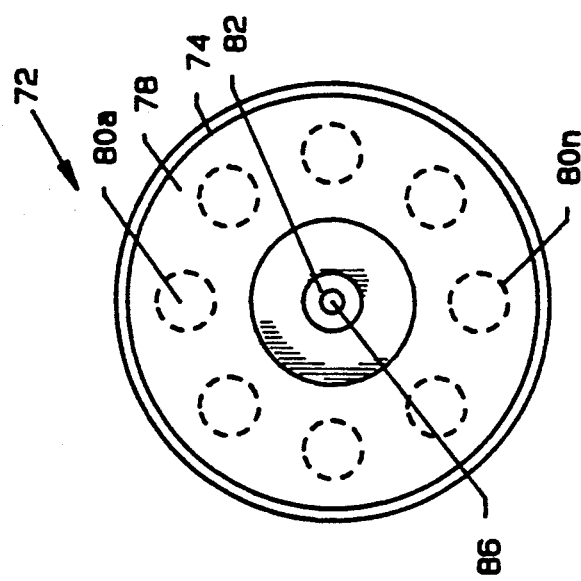
FIG. 6 illustrates a front view the gyro wheel.

FIG. 6 illustrates a front view of the gyro wheel 72 with the magnetic disk nearest the viewer where all numerals correspond to those elements previously described. Also included are the alternating positive and negative magnetic portions 80a–80n of the magnetic disk 78.

Figure 7:
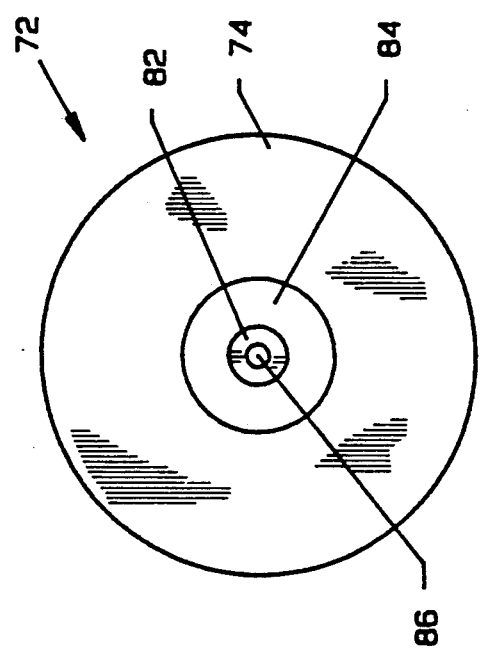
FIG. 7 illustrates a rear view of the gyro wheel.

FIG. 7 illustrates a rear view of the gyro wheel 72 with the steel disk 74 nearest the viewer where all numerals correspond to those elements previously described.

Figure 8:
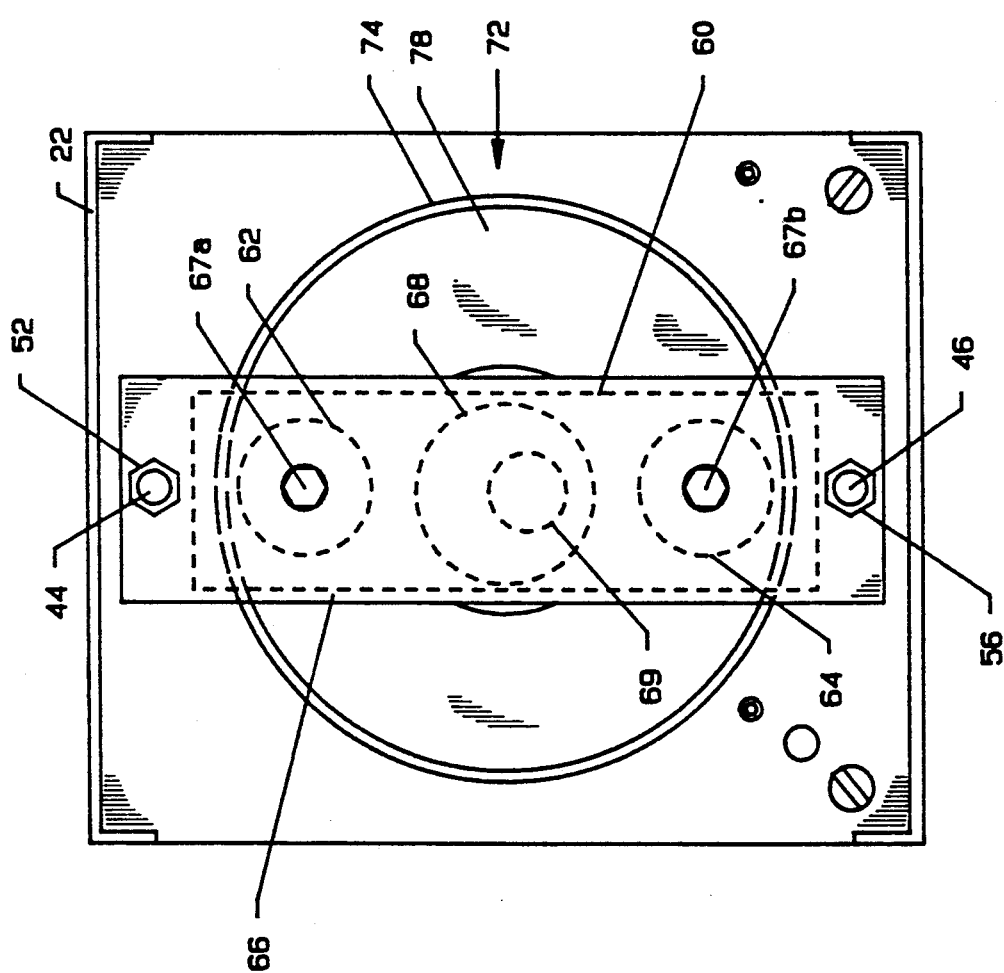
FIG. 8 illustrates a view along line 8—8 of FIG. 4.

FIG. 8 illustrates a view along lines 8—8 of FIG. 4 where all numerals correspond to those elements previously described. Illustrated in particular is the coil support 60 and coils 62 and 64.

Figure 9:
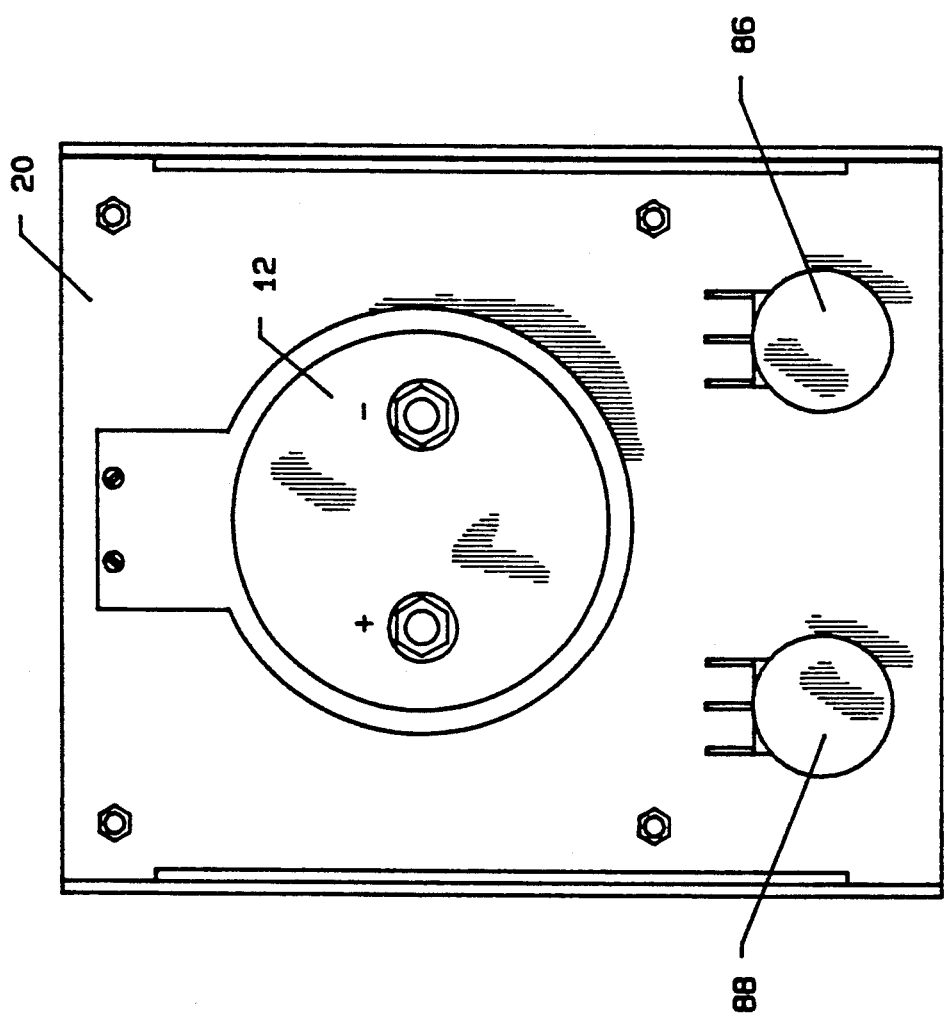
FIG. 9 illustrates a rear view of the front panel.

FIG. 9 illustrates a rear view of the front panel 20 including a rear view of the display meter 12 and the two potentiometers 86 and 88 for the light control and the centering control connected to light control knob 14 and centering control knob 16 illustrated in FIG. 1 where all numerals correspond to those elements previously described.

Figure 10:
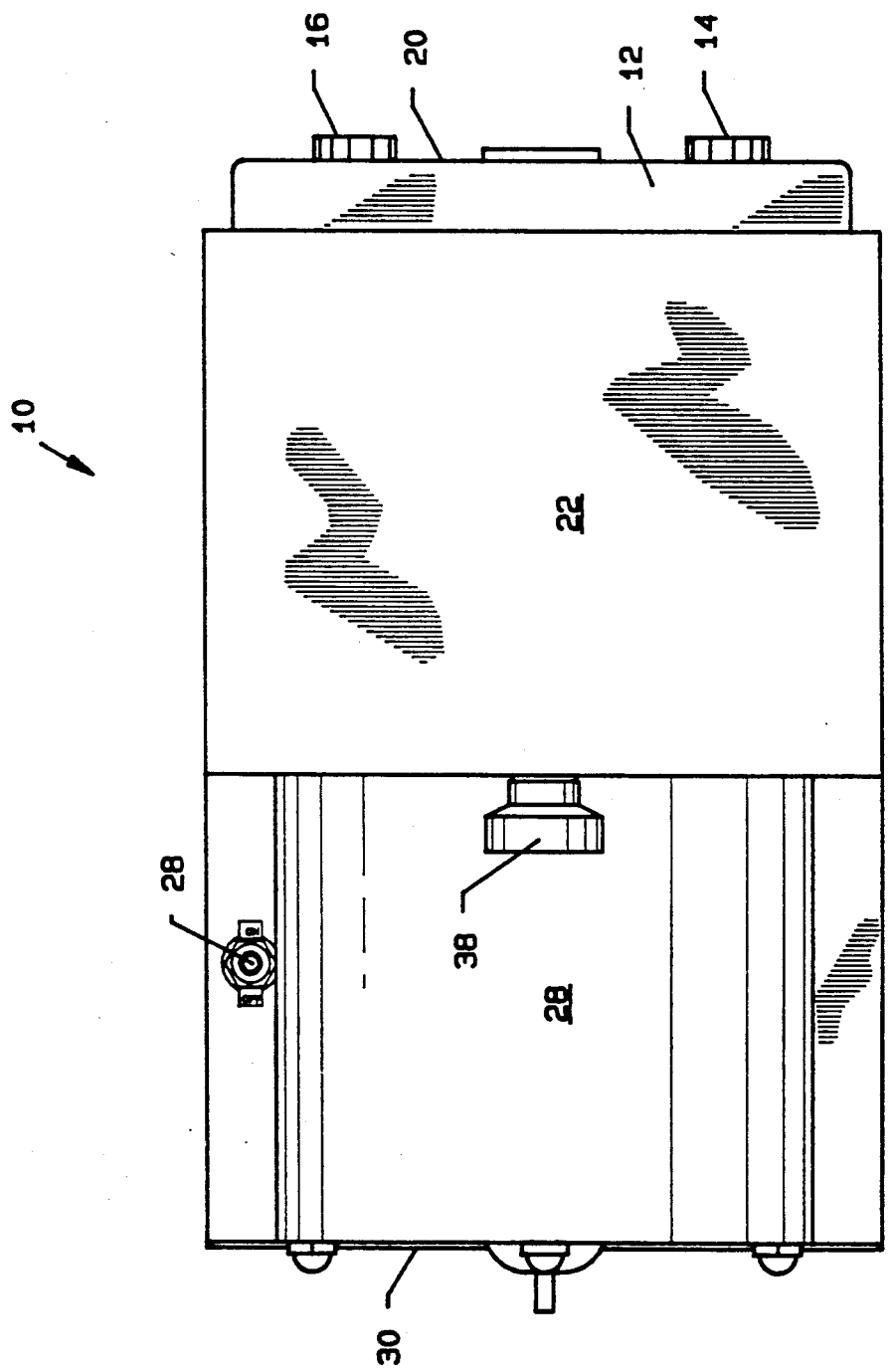
FIG. 10 illustrates a top view of the rate of turn indicator.

FIG. 10 illustrates a top view of the rate of turn indicator 10 where all numerals correspond to those elements previously described.

Figure 11:
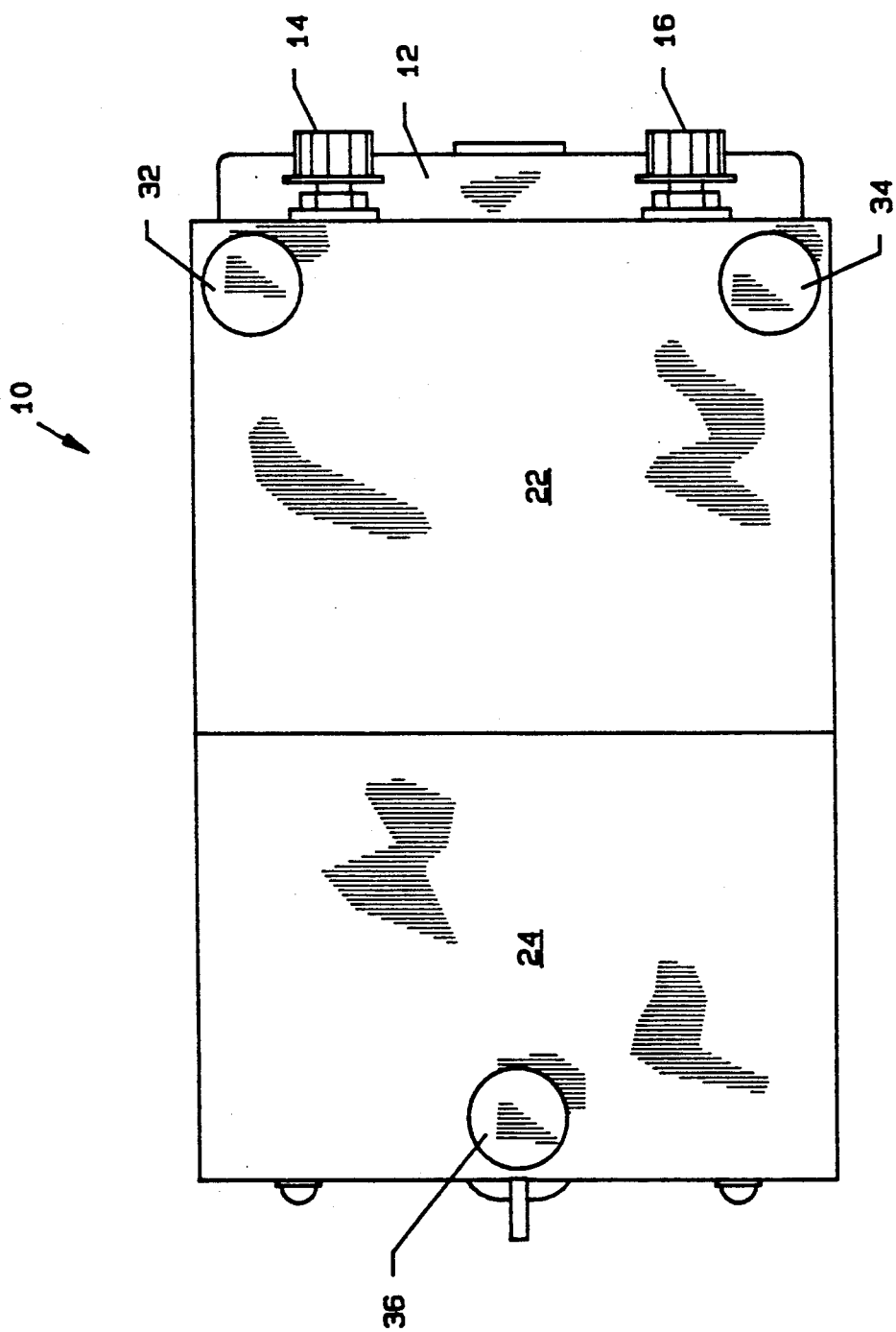
FIG. 11 illustrates a bottom view of the rate of turn indicator.

FIG. 11 illustrates a bottom view of the rate of turn indicator 10 where all numerals correspond to those elements previously described.

MODE OF OPERATION

Figure 12:
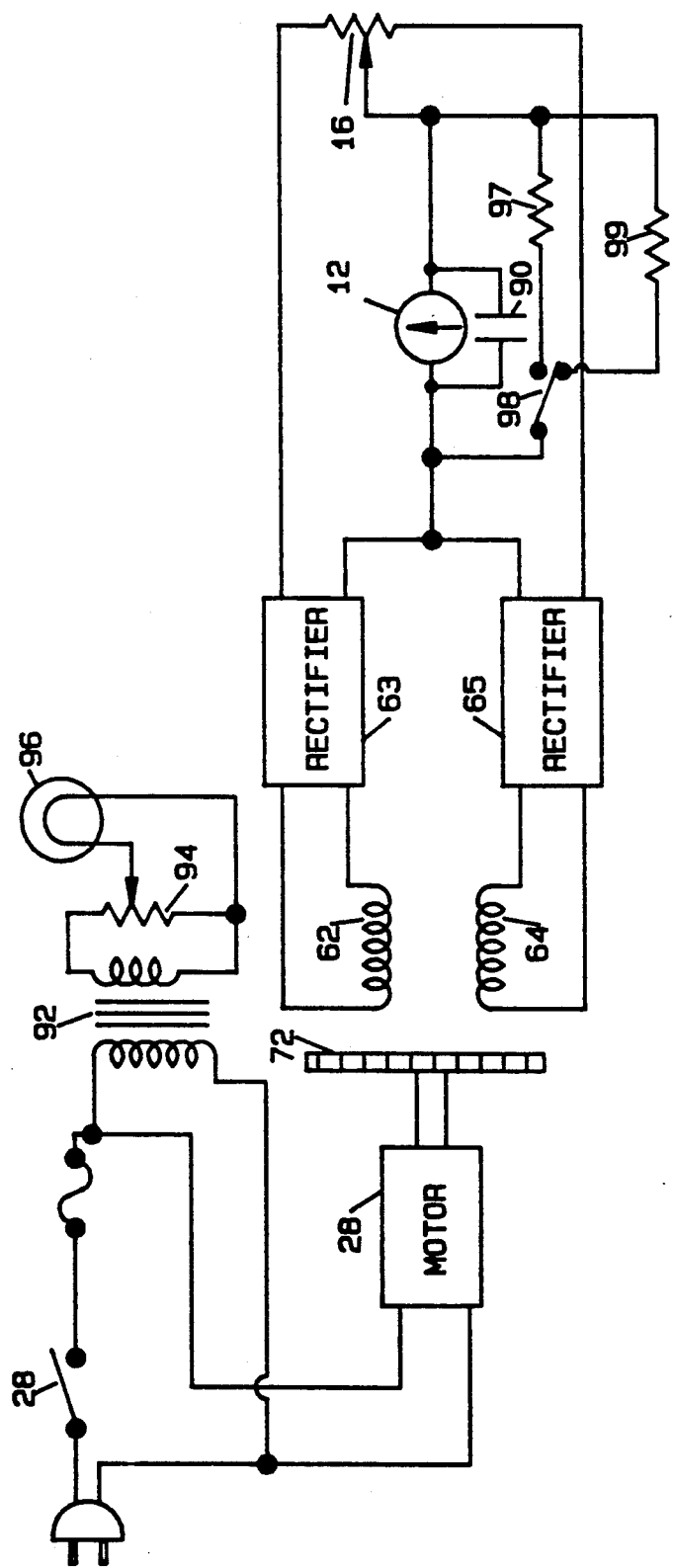
FIG. 12 illustrates an electrical schematic diagram of the rate of turn indicator.

FIG. 12, which illustrates an electrical circuit schematic diagram of the electrical circuit for the rate of turn indicator 10, shows an AC power cord and plug, a power switch, and a fuse connected in series. A transformer 92 provides power for the panel lamp 96, the brilliance of which is adjusted by a potentiometer 94. The motor is driven by the AC power and subsequently drives the flexible hub magnetic gyro wheel, including the plurality of permanent magnets about the flexible hub. The coils generate induced currents for full wave bridge rectifiers 63 and 65.

The voltage induced in the coils are proportional to the rate of turn of the vessel or vehicle such as a towboat utilizing the rate of turn indicator 10. The bridge rectifiers 63 and 65 rectify the coil voltage to a DC voltage to operate the rate of turn meter. The high/low sensitivity switch 98 in series with the meter shunt resistors 97 and 99 provide high, medium, and low sensitivity across the meter, such as for 60°/m, 20°/m with center position and 30°/m. The potentiometer 16 provides zero center of the rate of turn display meter 12. A capacitor 90 connected across the rate of turn meter.

Various modifications can be made to the present invention without departing from the apparent scope hereof.

I claim:

1. Rate of turn indicator for displaying a turn from a predetermined course comprising:
   a. a housing having a back wall;
   b. a motor secured to said housing;
   c. a power means for powering said motor;
   d. two coils diametrically spaced apart on a support means and spaced about a shaft of said motor, the support means being mounted within the housing on two shafts, each shaft having a first end mounted on the support means and a second end mounted on the back wall, and adjustment means for adjusting the spacing of the support means from the wall;
   e. a gyroscopic rotor mounted on said motor and facing said two coils;
   f. a signal processing means including said coils for generating an induced current signal responsively coupled to said gyroscopic rotor for generating a rate of turn signal; and,
   g. a signal display means connected to said signal processing means for displaying a rate of turn signal to an operator.

2. The rate of turn indicator of claim 1 wherein the shafts are threaded and wherein the means for adjusting includes a spring mounted about each shaft between the support means and the back wall, and first and second nuts mounted on the threaded shafts for shortening the shaft length between the support means and the back wall.

* * * * *